US006591274B1

(12) United States Patent
Smith et al.

(10) Patent No.: US 6,591,274 B1
(45) Date of Patent: Jul. 8, 2003

(54) COMPUTER SOFTWARE FRAMEWORK AND METHOD FOR ACCESSING DATA FROM ONE OR MORE DATASTORES FOR USE BY ONE OR MORE COMPUTING APPLICATIONS

(75) Inventors: Dwayne Smith, Louisville, TX (US); James Mwaura, Irving, TX (US)

(73) Assignee: Sprint Communications Company, L.P., Overland Park, KS (US)

( * ) Notice: Subject to any disclaimer, the term of this patent is extended or adjusted under 35 U.S.C. 154(b) by 329 days.

(21) Appl. No.: 09/583,705

(22) Filed: May 31, 2000

(51) Int. Cl.$^7$ ............................................. G06F 17/00
(52) U.S. Cl. ............................ 707/103; 707/3; 707/4; 707/104.1; 707/9; 717/108; 717/116
(58) Field of Search ............................ 707/1, 10, 103, 707/104.1, 3, 4, 9; 709/203–205, 223, 227; 717/108, 116

(56) References Cited

U.S. PATENT DOCUMENTS

| | | | | |
|---|---|---|---|---|
| 5,761,511 A | * | 6/1998 | Gibbons et al. | ............. 717/122 |
| 6,018,743 A | * | 1/2000 | Xu | ......................... 707/103 R |
| 6,085,198 A | * | 7/2000 | Skinner et al. | ............. 707/101 |
| 6,108,687 A | * | 8/2000 | Craig | ............................. 707/1 |
| 6,343,287 B1 | * | 1/2002 | Kumar et al. | ............... 707/100 |
| 6,366,916 B1 | * | 4/2002 | Baer et al. | ..................... 707/1 |

* cited by examiner

Primary Examiner—Jean R. Homere
Assistant Examiner—Leslie Wong
(74) Attorney, Agent, or Firm—Harley R. Ball; Steven J. Funk; Kevin D. Robb

(57) ABSTRACT

The present invention relates to a computer software framework and method for accessing data from a datastore. The invention discloses a framework for accessing data from a datastore. The framework is comprised of a datatable comprising data retrieved from a datastore. A first class object, a second class object, and a third class object populated with columns of data from the datatable, and the second class object is referenced by the first class object and the third class object is referenced by the second class object. A hashtable is used to cache the first, second, and third class objects such that the first class object is stored as a key in the hashtable and the second and third class objects are the corresponding value of that key in the hashtable. The method for accessing data from a datastore comprises creating a datatable comprising data retrieved from a datastore. A first class object, a second class object, and a third class object are populated with columns of data from the datatable. The second class object is referenced by the first class object and the third class object is referenced by the second class object. The first, second, and third class objects are cached in a hashtable such that the first class object is stored as a key in the hashtable and the second and third class objects are the corresponding value of that key in the hashtable.

13 Claims, 2 Drawing Sheets

COMPUTER SOFTWARE FRAMEWORK AND METHOD FOR ACCESSING DATA FROM ONE OR MORE DATASTORES FOR USE BY ONE OR MORE COMPUTING APPLICATIONS

BACKGROUND OF THE INVENTION

The present invention is a lightweight, service-oriented computer software framework and method that provides applications with a flexible means to access data from a datastore without the need to perform multiple datastore queries.

A company may have a number of different business units providing a variety of products and services such as long distance service, mobile phone service, cable television service, etc. Each business unit within the company providing these individual services may have a separate computing system hosting a variety of business applications, which in turn may interact with any number of lower level datastores to create, retrieve, update, and delete data processed by the application. Much of the data residing in the various datastores will be reference data, which for purposes of this application means persisted data that typically does not need to be modified often. Thus, users requiring access; to reference data typically require read-only access to such data. A need exists for an efficient way to access data, and in particular reference data, from a plurality of datastores residing across the various computing systems of an entire enterprise.

In the past, individual applications accessed reference data directly from a datastore. For example, to access reference data from a relational database, an application would make the necessary structured query language (SQL) calls to query the tables for the necessary data. The problem with this approach is that such calls would be specific to the table and database, which would require that they be rewritten if the table was modified or the database was changed. Furthermore, if a significant number of applications is each making a separate call to the datastore for data, the system can easily become overloaded, thus decreasing operational efficiency and response time. This is particularly a problem where multiple applications (or a plurality of users running the same application) are using similar data sets, as the datastore must respond to multiple calls for substantially the same data.

The current invention addresses the need for an enterprise-level framework and method to encapsulate the retrieval of data from a datastore, thereby minimizing the number of calls to and queries performed by the datastore. Multiple applications (or a plurality of users running the same application) are provided with a single interface to a cache of data, thereby improving data retrieval performance by greatly reducing the need for each application or user to call and query the datastore directly. Furthermore, the applications are isolated from the underlying datastores, thereby allowing changes to the underling data, datatables, or datastores without necessitating revision of the applications' programming code.

SUMMARY OF THE INVENTION

The present invention relates to a computer software framework and method for accessing data from a datastore. The invention discloses a framework for accessing data from a datastore, comprising a datatable comprising data retrieved from a datastore; a first class object, a second class object, and a third class object populated with columns of data from the datatable, wherein the second class object is referenced by the first class object and wherein the third class object is referenced by the second class object; and a hashtable caching the first, second, and third class objects such that the first class object is stored as a key in the hashtable and the second and third class objects are the corresponding value of that key in the hashtable.

The invention further discloses a method for accessing data from a datastore, comprising the steps of creating a datatable comprising data retrieved from a datastore; populating a first class object, a second class object, and a third class object with columns of data from the datatable, wherein the second class object is referenced by the first class object and wherein the third class object is referenced by the second class object; and caching the first, second, and third class objects in a hashtable such that the first class object is stored as a key in the hashtable and the second and third class objects are the corresponding value of that key in the hashtable.

DETAILED DESCRIPTION OF THE INVENTION

Figure 1:
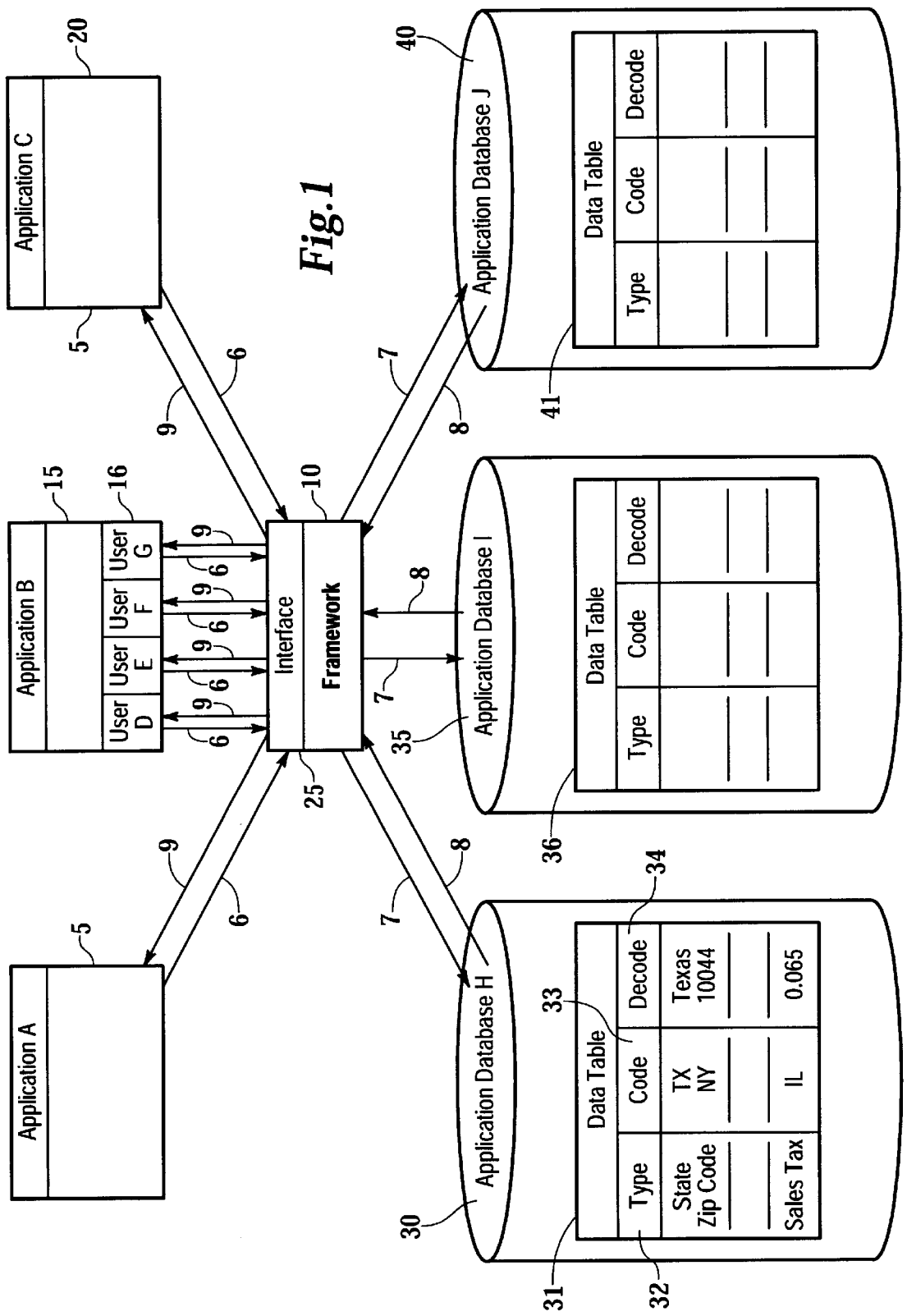
FIG. 1 is a graphical representation of the invention.

In carrying out the invention as shown in FIG. 1, a user of a business application calls the framework, as represented by arrows 6 from business applications 5, 15, and 20 (as well as multiple users 16) to framework interface 25. Framework 10 begins a datastore session, wherein at least one datastore 30 (and optionally a plurality of datastores 30, 35, and 40) is queried as represented by arrows 7. Data is retrieved from the datastore and placed in a datatable 31 (or optionally a plurality of datatables 31, 36, and 41). The content of the initial database query may be defined in the framework initialization file, or may be specified directly by the business application upon accessing the framework. As represented by arrows 8, data objects within the framework are populated with columns of data from the datatable, and the data objects are further cached within a hashtable. In response to calls from the business applications, cached data is supplied by the framework, as represented by arrows 9, for further processing by the business applications.

The framework 10 of the current invention provides business applications 5, 15, and 20 (some of which may have a plurality of users 16) with a common interface 25 to data stored in a variety of datastores 30, 35, and 40. One advantage of the current invention is that it provides a single interface to perform datastore manipulation that might otherwise require two or more separate interfaces. In other words, the invention encapsulates the capabilities of multiple datastores into a single interface. Where a wide variety of datastores are to be used in practicing the current invention, it may be desirable to integrate the use of a specialized framework for isolating business applications from datastores such as the framework and method disclosed and claimed in co-pending Sprint patent application IDF 1415, which is U.S. application number [to be assigned], which is incorporated herein by reference in its entirety. Datastore as used herein means any type of data storage software, device or medium, including datafiles, databases, memory chips, hard drives, floppy drives, magnetic storage media, optical storage media, and the like. Preferably, the datastore is a database, which can be either a relational or object database. Most preferably, the datastore is a relational database. Examples of suitable databases are relational databases produced by Oracle, Inc. and object databases produced by Versant Inc. The datastore can be located remotely and accessed by means such as the Object Management Group's Common Object Request Broker Architecture (CORBA), which retrieves information from remotely located underlying datastores such as relational databases. When the underlying datastore comprises a relational database, object-relational (OR) mapping tools, such as TOPLink produced by The Object People, Inc., optionally may be used in carrying out the invention. As known to those skilled in the art, OR mapping tools serve as a communications bridge between object technology and relational database technology. Likewise, Java Database Connectivity (JDBC, which is available from Sun Microsystems, Inc.) can be used to in carrying out this invention to serve as a communications bridge between the preferred Java programming language of the framework and wide-range of relational databases. JDBC provides a call-level application programming interface (API) for SQL-based databases. In a preferred embodiment of the invention described herein, Oracle Inc.'s "type 4" thin driver is used to connect to a relational database. The Java/Versant interface (JVI) available from Versant Inc. can be used to in carrying out this invention to serve as a communications bridge between the Java programming language and object databases produced by Versant Inc.

A preferred computer language for carrying out the invention is the Java programming language available from Sun Microsystems Inc. While the code examples herein are written in Java, other suitable programming languages may be used as will be readily apparent to one skilled in the art. Furthermore, it should be understood that the code examples are in skeleton or outline form, and are not necessarily intended to be in complete executable form, provided however that one skilled in the art could easily tailor executable code based upon these examples.

As shown in FIG. 1, a variety of datastores, both in terms of the number of datastores. as well as the type (e.g., relational database, object database, etc.) may be used in carrying out this invention. Data from the underlying datastores 30, 35, and 40 is retrieved and placed in a tabular format to create datatables 31, 36, and 41, respectively. While it is shown in FIG. 1 that datatable 31 directly corresponds to datastore 30, the data populating a given datatable may be retrieved from any number and type of underlying datastores. For example, data in datatable 31 could be taken from datastores 30, 35, and 40, or any combination thereof. Preferably, datatables are populated with reference data (i.e., read-only data), but any suitable data type may be used. A preferred datatable structure is as follows:

| Column Name | Null | Type |
|---|---|---|
| TYPE | NOT | VARCHAR2(20) |
| CODE | NOT | VARCHAR2(20) |
| DECODE | NOT | VARCHAR2(20) |

Under the column name heading, three classes of data objects have been identified corresponding to three columns in the datatable: a first class data object referred to as "type"; a second class data object referred to as "code"; and a third class data object referred to as "decode." While a preferred embodiment of the invention is described using three columns in the datatable (e.g., type, code, and decode), any manageable number of columns may be used and any suitable terms may be used to identify the data objects. Each data object is defined as string.

Using the datatable structure above, a datatable such as 31 shown in FIG. 1 can be created having three columns 32, 33, and 34 corresponding to data objects type, code, and decode, respectively. As shown in FIG. 1, a datatable may contain a number of different types of data, corresponding to one or more codes, which in turn correspond to one or more decodes. As discussed previously, the data objects type, code, and decode correspond generically to a first class data object, a second class data object, and a third class data object, respectively. Thus, for a given instantiation of a data object, the relationship may be described generically as a first class object, a second class object, and a third class object populated with columns of data from the datatable, wherein the second class object is referenced by the first class object and wherein the third class object is referenced by the second class object.

For example, in datatable 31, one type of data is zip code, for which there may be a number of codes (e.g., states such as New York, etc.) and a number of decodes for each code (e.g., zip codes such as 10044 for New York, etc.). Datatable 31 may further comprise another type of data such as sales tax rates, for which there may be a number of codes (e.g., states such as Illinois, etc.) and a single decode for each code (e.g., a sales tax rate such as 8.5% for Illinois, etc.). In sum, a data type may contain many data codes, and a data code may contain many data decodes.

The data objects contained in the datatable are cached in a hashtable having a key column and a values column. The first class object from the datatable (i.e., the type data object) is stored as a key in the hashtable and the second and third class objects from the datatable (i.e., the code and decode data objects, respectively) are the corresponding value of that key in the hashtable. The type data object is in the form of a string, the code data object is in the form of a string, and the decode data object is in the form of a vector. A vector is a means for referring to a collection of objects which is well known to one skilled in the art. The hashtable key is in the form of a string, and the hashtable key values are in the form of vectors.

Figure 2:
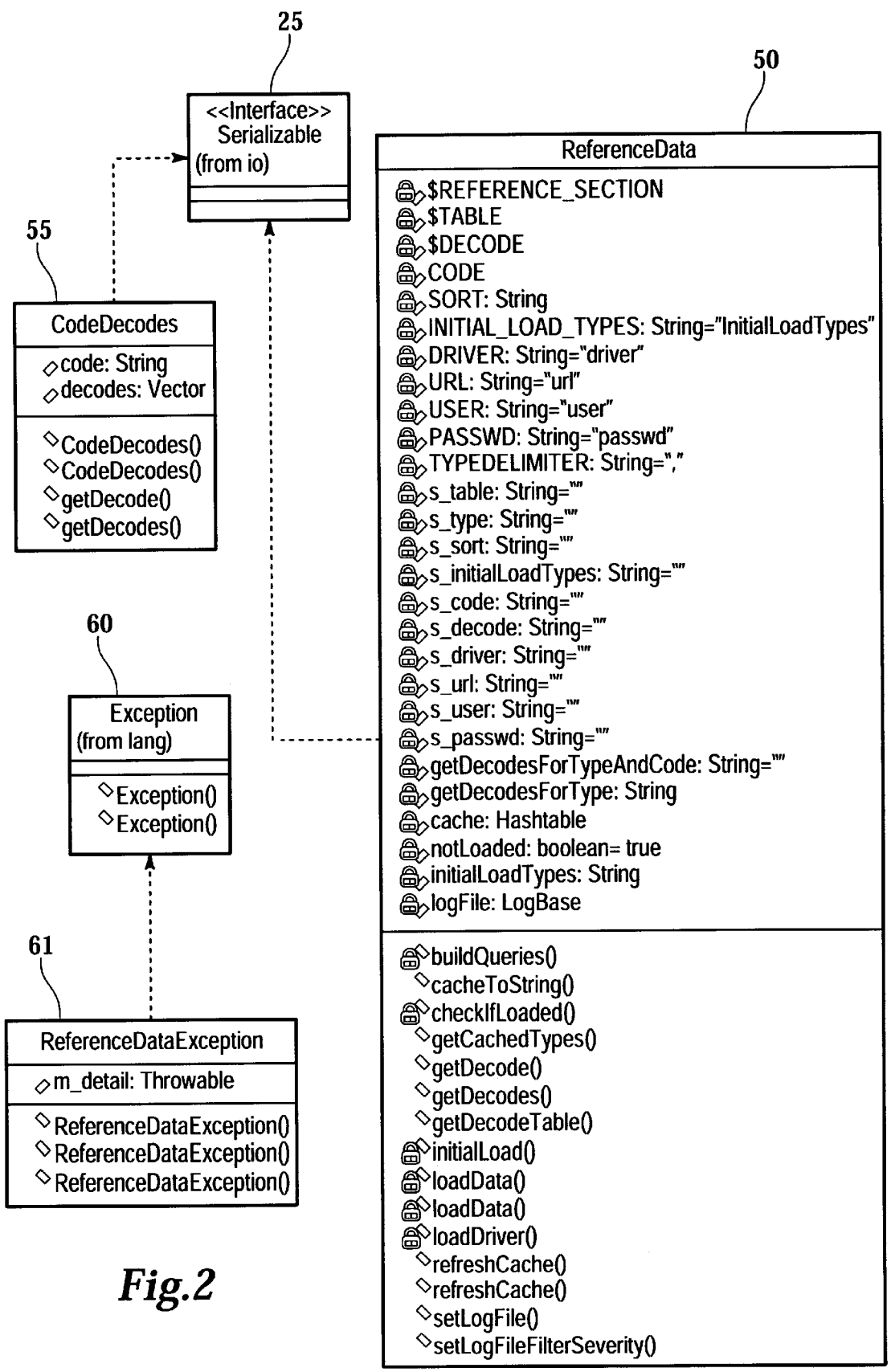
FIG. 2 is a class diagram of the invention.

In a preferred embodiment, business applications 5, 15, and 20 access framework 10 through interface 25 as a Java API having three classes: ReferenceData class 50, CodeDecodes class 55, and Exception class 60, as shown in FIG. 2. CodeDecodes is a class representation of the data structure used by the business applications for further data processing such as organizing and storing data. The ReferenceData class. is responsible for database connection, initialization and all other useful functions and is the class used most frequently by the application. ReferenceDataException class 61 is inherited from Java language Exception 60 and is responsible for all the throwable exceptions of framework. These exceptions are thrown if errors occur and are used for troubleshooting the framework. The following table lists the public API's (i.e., methods) for the ReferenceData class and the CodeDecodes class:

Public class ReferenceData implements Serializable
{
public static String[ ] getCachedTypes( ) throws ReferenceDataException;

-continued

```
public static String getDecode(String type, String code) throws
ReferenceDataException;
public static String[ ] getDecodes(String type, String code) throws
ReferenceDataException;
public static Hashtable getDecodeTable(String type) throws
ReferenceDataException;
public static synchronized void refreshCache( ) throws
ReferenceDataException;
public static synchronized void refreshCache(String[ ] types) throws
ReferenceDataException;
public static String cacheToString( )throws ReferenceDataException;
}
public class CodeDecodes implements Serializable
{
public String getDecode( );
public String[ ] getDecodes( );
}
```

Business applications access the cached data by calling "get" methods on framework 10. The getCachedTypes( ) method returns an array of all the 'types' that are currently in the cache. The getDecode(String type, String code) method returns a 'decode' for a given 'type' and 'code'. If the 'code' has more than one decode, it returns the first 'decode' in the collection. If the 'code' and or the 'type' are not found, 'null' is returned. The getDecodes(String type, String code) method returns an array of 'decodes' for a given 'type' and 'code'. If the 'code' and or the 'type' are not found, 'null' is returned. The getDecodeTable(String type) method, given a 'type', returns a hashtable with key value pairs for the codes(keys—String) and their decodes (values—String[ ]). If the 'type' is not found, 'null' is returned. The refreshCache( ) method refreshes the cache with it's current 'types'. The refreshCache(String[ ] types) method refreshes the cache with the given 'types'. The cacheToString( ) method returns a String representation of the cache. If the cache is empty, 'null' is returned.

EXAMPLE

The following pseudo-code, written in Java, outlines a representative embodiment of the invention, where the italicized text following the double backslashes (i.e., "//") is commentary text. For initial load, an initialization file with a name such as 'main.ini' should contain the following code:

```
[Reference Data portion of main initialization file]
sort=ascend // defines how data will be sorted
user=userid // identifies user
passwd=password
driver=oracle.jdbc.driver.OracleDriver // sets the database driver
url=jdbc:oracle:thin:@144.226.224.61:1521:d1com1 // identifies location
of database
tableName=reference // identifies the datatable to be used
code=code // identifies columns of data from datatable and
assigns them to data objects
decode=decode // identifies columns of data from datatable,
assigns them to data objects
type=type // identifies columns of data from datatable and
assigns them to data objects
intialLoadTypes=Tax,State,Area Code // identifies the data from datatable
to be initially cached
```

An initial call to any of the following public API methods performs all the necessary initialization and reads in and caches all the 'types' set by the 'intialLoadTypes' entry in. the 'Reference Data' section of the 'main.ini' file:

```
public static String[ ] getCachedTypes( );
public static String getDecode(String type, String code);
public static String[ ] getDecodes(String type, String code);
public static Hashtable getDecodeTable(String type);
public static synchronized void refreshCache( );
public static synchronized void refreshCache(String[ ] types);
public static String cacheToString( );
```

For the initial method call, call any of the 'getDecode*' methods as follows:

```
{
//1. To retrieve decodes for a specific code and type do:
String[ ] txAreaCodes = ReferenceData.getDecodes("Area Code", "TX");
if (txAreaCodes != null)
//do something with the 'decodes'
else
// The type and or the code were not found, see the tracing log file for
//details
//2. To retrieve a decode for a specific code and type do:
String txAreaCode = ReferenceData.getDecode("Area Code", "TX");
if (txAreaCode != null)
//do something with the 'decode'
else
//The type and or the code were not found, see the tracing log file for
//details
//3. To retrieve all the codes and decodes of a specific type do:
Hashtable areaCodes = ReferenceData.getDecodeTable("Area Code");
if (areaCodes != null)
{
//Get all the 'TX' area codes, remember to cast to values to String arrays
String[ ] txAreaCodes = (String[ ]) areaCodes.getObject("TX");
if (txAreaCodes != null)
//do something with the 'decodes'
else
//The code was not found
}
else
//The type was not found, see the tracing log file for details
//4. To determine what types are cached, do:
String[ ] cachedTypes = ReferenceData.getCachedTypes( );
if(cachedTypes != null)
//Use the array to make some decisions e.g. which 'Types' to refresh the
//cache with
else
//The cache is empty, see the tracing log file for details
//5. To refresh the cache, do:
//with types that are already cached:
ReferenceData.refreshCache( );
//with provided types:
String[ ] refreshTypes = {"Zip Code","Insurance Rate"};
ReferenceData.refreshCache(refreshTypes);
} catch (ReferenceDataException rde) {
//handle the exception by logging, re-throwing etc.
}
```

Following the initial method call, any number of applications and users having access to the framework may retrieve cached data by repeating the method calls to the framework. By retrieving cached data from the framework, the number of direct calls and queries to the underlying datastores is greatly minimized, thereby improving overall system efficiency.

What is claimed is:

1. A framework for accessing data from one or more datastores for use by one or more computing applications, comprising:

(a) a datatable comprising data retrieved from a datastore;

(b) a first class object, a second class object, and a third class object populated with columns of data from the datatable, wherein the second class object is referenced by the first class object and wherein the third class object is referenced by the second class object; and (c) a hashtable caching the first, second, and third class objects such that the first class object is stored as a key in the hashtable and the second and third class objects are the corresponding value of that key in the hashtable.

2. The framework of claim 1 wherein the datastore is a relational database.

3. The framework of claim 1 wherein the datastore is an object database.

4. The framework of claim 1 wherein the datastore is accessed remotely.

5. The framework of claim 1 wherein data in the second class object is in the form of a string and data in the third class object is in the form of a vector.

6. The method of claim 5 wherein the hashtable key value is in the form of a vector.

7. A method for accessing data from one or more datastores for use by one or more computing applications, comprising:

(a) creating a datatable comprising data retrieved from a datastore;

(b) populating a first class object, a second class object, and a third class object with columns of data from the datable, wherein the second class object is referenced by the first class object and wherein the third class object is referenced by the second class object; and (c) caching the first, second, and third class objects in a hashtable such that the first class object is stored as a key in the hashtable and the second and third class objects are the corresponding value of that key in the hashtable.

8. The method of claim 7 further comprising the step of retrieving data from the hashtable for use by a computer application.

9. The method of claim 7 wherein the datastore is a relational database.

10. The method of claim 7 wherein the datastore is an object database.

11. The method of claim 7 wherein the datastore is accessed remotely.

12. The method of claim 7 wherein data in the second class object is in the form of a string and data in the third class object is in the form of a vector.

13. The method of claim 12 wherein the hashtable key value is in the form of a vector.

* * * * *